United States Patent
Chen et al.

(10) Patent No.: US 10,896,648 B2
(45) Date of Patent: Jan. 19, 2021

(54) IMAGE DISPLAY APPARATUS AND PROJECTION UNIT FOR IMAGE CORRECTION BASED ON PIXEL VALUES

(71) Applicant: SONY CORPORATION, Tokyo (JP)

(72) Inventors: Feng Chen, Kanagawa (JP); Takaaki Suzuki, Tokyo (JP); Takahiro Nagano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 15/558,776

(22) PCT Filed: Jan. 12, 2016

(86) PCT No.: PCT/JP2016/000112
§ 371 (c)(1),
(2) Date: Sep. 15, 2017

(87) PCT Pub. No.: WO2016/157670
PCT Pub. Date: Oct. 6, 2016

(65) Prior Publication Data
US 2018/0247601 A1    Aug. 30, 2018

(30) Foreign Application Priority Data
Mar. 27, 2015    (JP) ................................. 2015-066635

(51) Int. Cl.
*G09G 3/36* (2006.01)
*H04N 9/31* (2006.01)
(Continued)

(52) U.S. Cl.
CPC ......... *G09G 3/3607* (2013.01); *H04N 9/3147* (2013.01); *H04N 9/3155* (2013.01);
(Continued)

(58) Field of Classification Search
CPC ...... G09G 3/001; G09G 3/002; G09G 3/3433; G09G 3/3446; G09G 3/3453; G09G 3/346;
(Continued)

(56) References Cited

U.S. PATENT DOCUMENTS

| | | | |
|---|---|---|---|
| 10,163,402 B2 * | 12/2018 | Kamio | G09G 3/20 |
| 2003/0016236 A1 * | 1/2003 | Bronson | G09G 3/002 |
| | | | 345/633 |

(Continued)

FOREIGN PATENT DOCUMENTS

| | | |
|---|---|---|
| GB | 2485679 A | 5/2012 |
| JP | 2003-125317 A | 4/2003 |

(Continued)

OTHER PUBLICATIONS

International Search Report and Written Opinion of PCT Application No. PCT/JP2016/000112, dated Mar. 29, 2016, 11 pages of ISRWO.

*Primary Examiner* — Alexander Eisen
*Assistant Examiner* — Nelson Lam
(74) *Attorney, Agent, or Firm* — Chip Law Group

(57) ABSTRACT

An image display apparatus according to an embodiment of the present technology includes a correction unit and a display control unit. The correction unit corrects, for correcting deterioration of an image to be projected on the basis of image information including a pixel value of each pixel, the pixel value of each pixel included in the image information. The display control unit changes, for a pixel whose pixel value exceeds an upper limit value by the correction, the pixel value to a value equal to or smaller than the upper limit value and increases display luminance of the pixel exceeding the upper limit value within the image to be projected.

14 Claims, 13 Drawing Sheets

(51) Int. Cl.
*G09G 3/00* (2006.01)
*H04N 9/64* (2006.01)
*H04N 9/73* (2006.01)

(52) U.S. Cl.
CPC .......... *H04N 9/3182* (2013.01); *H04N 9/3188* (2013.01); *H04N 9/3194* (2013.01); *G09G 3/002* (2013.01); *G09G 2320/0233* (2013.01); *G09G 2320/0271* (2013.01); *G09G 2360/16* (2013.01); *H04N 9/646* (2013.01); *H04N 9/73* (2013.01)

(58) Field of Classification Search
CPC ...... G09G 3/3486; G09G 3/3493; G09G 3/36; G09G 3/364
USPC .................................... 345/84–104, 108–109
See application file for complete search history.

(56) References Cited

U.S. PATENT DOCUMENTS

| | | | |
|---|---|---|---|
| 2008/0117387 A1 | 5/2008 | Hamano et al. | |
| 2009/0096938 A1* | 4/2009 | Ouchi | H04N 9/3147 348/744 |
| 2009/0147153 A1* | 6/2009 | Hasegawa | H04N 5/20 348/744 |
| 2009/0243983 A1* | 10/2009 | Ohashi | G09G 3/3648 345/89 |
| 2011/0234921 A1* | 9/2011 | Ivashin | H04N 9/3147 348/745 |
| 2012/0127216 A1 | 5/2012 | Kimura | |
| 2012/0256818 A1* | 10/2012 | Kuroki | G09G 3/3413 345/102 |
| 2013/0201403 A1* | 8/2013 | Iversen | H04N 13/106 348/659 |
| 2013/0307755 A1* | 11/2013 | Tomita | G06F 3/1423 345/1.1 |
| 2014/0092147 A1* | 4/2014 | Kimura | G09G 3/3426 345/690 |
| 2014/0146089 A1* | 5/2014 | Kuno | G09G 3/3406 345/690 |
| 2015/0116376 A1* | 4/2015 | Kimura | G09G 3/3406 345/690 |
| 2017/0018232 A1* | 1/2017 | Nicholson | G09G 3/002 |
| 2019/0206027 A1* | 7/2019 | Uemura | H04N 9/3188 |
| 2020/0027377 A1* | 1/2020 | Kobayashi | G09G 3/3406 |

FOREIGN PATENT DOCUMENTS

| | | |
|---|---|---|
| JP | 2004-207800 A | 7/2004 |
| JP | 2008-020822 A | 1/2008 |
| JP | 2008-131099 A | 6/2008 |
| JP | 2009-092983 A | 4/2009 |
| JP | 2012-004772 A | 1/2012 |
| JP | 2012-128394 A | 7/2012 |

* cited by examiner

IMAGE DISPLAY APPARATUS AND PROJECTION UNIT FOR IMAGE CORRECTION BASED ON PIXEL VALUES

CROSS REFERENCE TO RELATED APPLICATIONS

This application is a U.S. National Phase of International Patent Application No. PCT/JP2016/000112 filed on Jan. 12, 2016, which claims priority benefit of Japanese Patent Application No. JP 2015-066635 filed in the Japan Patent Office on Mar. 27, 2015. Each of the above-referenced applications is hereby incorporated herein by reference in its entirety.

TECHNICAL FIELD

The present technology relates to an image display apparatus such as a projector, an image display method, an information processing apparatus that controls the image display apparatus, an information processing method, and a program.

BACKGROUND ART

From the past, image display apparatuses such as a projector are in wide use. For example, an image is displayed by modulating light from a light source by a light modulation device such as a liquid crystal device and projecting the modulated light onto a screen or the like. As the light modulation device, a reflection-type liquid crystal display device, a transmission-type liquid crystal device, a DMD (Digital Micromirror Device), or the like is used.

In a projector disclosed in Patent Literature 1, a technology for reducing image deterioration due to lowering of imaging performance in a projection optical system and generating a projection image close to input image information is disclosed. In this projector, inverse filter processing for compensating for projection image deterioration is executed using an MTF (Modulation Transfer Function)-lowering inverse filter of a projection lens. After that, judgment is made on whether a result of the inverse filter processing is within a range expressible by a light modulation unit for each predetermined pixel area. Then, image information of an unexpressible pixel area is restored to image information of the original image or changed to an expressible limit value. Accordingly, although the original image cannot be fully reproduced, a high-quality image can be projected (paragraphs [0026], [0031], [0035], etc. in specification of Patent Literature 1).

CITATION LIST

Patent Literature

Patent Literature 1: Japanese Patent Application Laid-open No. 2008-131099

DISCLOSURE OF INVENTION

Technical Problem

In this way, in the image display apparatus such as a projector, a technology that prevents generation of a blur due to performance of a projection optical system and the like and enables a high-quality image to be projected is being demanded.

In view of the circumstances as described above, the present technology aims at providing an information processing apparatus, an information processing method, a program, and an image display apparatus that enable a high-quality image to be projected.

Solution to Problem

To attain the object described above, an image display apparatus according to an embodiment of the present technology includes a correction unit and a display control unit.

The correction unit corrects, for correcting deterioration of an image to be projected on the basis of image information including a pixel value of each pixel, the pixel value of each pixel included in the image information.

The display control unit changes, for a pixel whose pixel value exceeds an upper limit value by the correction, the pixel value to a value equal to or smaller than the upper limit value and increases display luminance of the pixel exceeding the upper limit value within the image to be projected.

In this image display apparatus, the pixel values are corrected for correcting deterioration of a projection image. In a case where the pixel value exceeds the upper limit value as a result of the correction, that pixel value is changed to a value equal to or smaller than the upper limit value. Then, the display luminance of the relevant pixel (pixel whose pixel value exceeds upper limit value by correction) in the projection image is increased. Accordingly, it becomes possible to sufficiently prevent a blur and the like of the projection image and project a high-quality image.

The image display apparatus may further include an image projection unit.

The image projection unit includes a light source unit, a light modulation unit that generates an image by modulating light from the light source unit, and a projection unit that projects an image generated by the light modulation unit.

In this case, the display control unit may reduce the pixel value of the pixel exceeding the upper limit value and increase output luminance of the light source unit.

Accordingly, it becomes possible to express pixel values exceeding the upper limit value and project a high-quality image.

The display control unit may reduce the pixel value of the pixel exceeding the upper limit value by a predetermined ratio and increase the output luminance of the light source unit by a ratio which becomes a reciprocal number of the predetermined ratio.

Accordingly, it becomes possible to truly project an image based on the corrected image information.

The image display apparatus may further include a plurality of image projection units that generate and project images. In this case, the display control unit may distribute, for the pixel exceeding the upper limit value, the pixel value to a plurality of distribution pixel values and cause the plurality of image projection units to project on the basis of the plurality of distribution pixel values.

Accordingly, it becomes possible to express pixel values exceeding the upper limit value and project a high-quality image.

The plurality of image projection units may include a main image projection unit and a sub-image projection unit. In this case, the display control unit may output the upper limit value to the main image projection unit and output a difference between the pixel value of the pixel exceeding the upper limit value and the upper limit value to the sub-image projection unit.

Accordingly, it becomes possible to easily express pixel values exceeding the upper limit value.

A resolution of an image projectable by the sub-image projection unit may be lower than that of an image projectable by the main image projection unit.

Costs can be suppressed by using an inexpensive sub-image projection unit having a low resolution.

Maximum luminance that the sub-image projection unit is capable of outputting may be lower than that which the main image projection unit is capable of outputting.

Costs can be suppressed by using an inexpensive sub-image projection unit having low maximum luminance.

The display control unit may set, for a pixel whose pixel value falls below a lower limit value by the correction, the pixel value to become close to a pixel value obtained before the correction.

Accordingly, it becomes possible to suppress deterioration of a projection image due to pixel values that fall below the lower limit value.

The display control unit may change the pixel value of the pixel falling below the lower limit value to a value obtained by adding the lower limit value and the pixel value of the pixel falling below the lower limit value by a ratio corresponding to a difference between those values.

Accordingly, it becomes possible to sufficiently suppress lowering of image quality accompanying the change of pixel values that fall below the lower limit value.

The display control unit may output the pixel value of each pixel included in the image information to the correction unit while increasing the pixel value of each pixel only by a certain value.

Accordingly, it becomes possible to suppress generation of pixels that fall below the lower limit value and project a high-quality image.

The correction unit may adjust, for a pixel whose pixel value falls below a lower limit value by the correction, a correction intensity of a pixel value obtained before the correction in accordance with a difference between the lower limit value and the pixel value of the pixel falling below the lower limit value, and correct the pixel value obtained before the correction by the adjusted correction intensity.

Accordingly, it becomes possible to suppress generation of pixels that fall below the lower limit value and project a high-quality image.

An image display method according to an embodiment of the present technology includes correcting a pixel value of each pixel included in image information for correcting deterioration of an image.

For a pixel whose pixel value exceeds an upper limit value by the correction, the pixel value is changed to a value equal to or smaller than the upper limit value, and display luminance of the pixel exceeding the upper limit value within an image to be projected is increased.

An information processing apparatus according to an embodiment of the present technology includes the correction unit and the display control unit.

An information processing method according to an embodiment of the present technology is an information processing method executed by a computer and includes correcting, for correcting deterioration of an image to be projected by an image display apparatus on the basis of image information including a pixel value of each pixel, the pixel value of each pixel included in the image information.

For a pixel whose pixel value exceeds an upper limit value by the correction, the pixel value is changed to a value equal to or smaller than the upper limit value, and display luminance of the pixel exceeding the upper limit value within the image to be projected by the image display apparatus is increased.

A program according to an embodiment of the present technology causes a computer to execute the information processing method.

Advantageous Effects of Invention

As described above, according to the present technology, a high-quality image can be projected. It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

First Embodiment (Image Display Apparatus)

Figure 1:
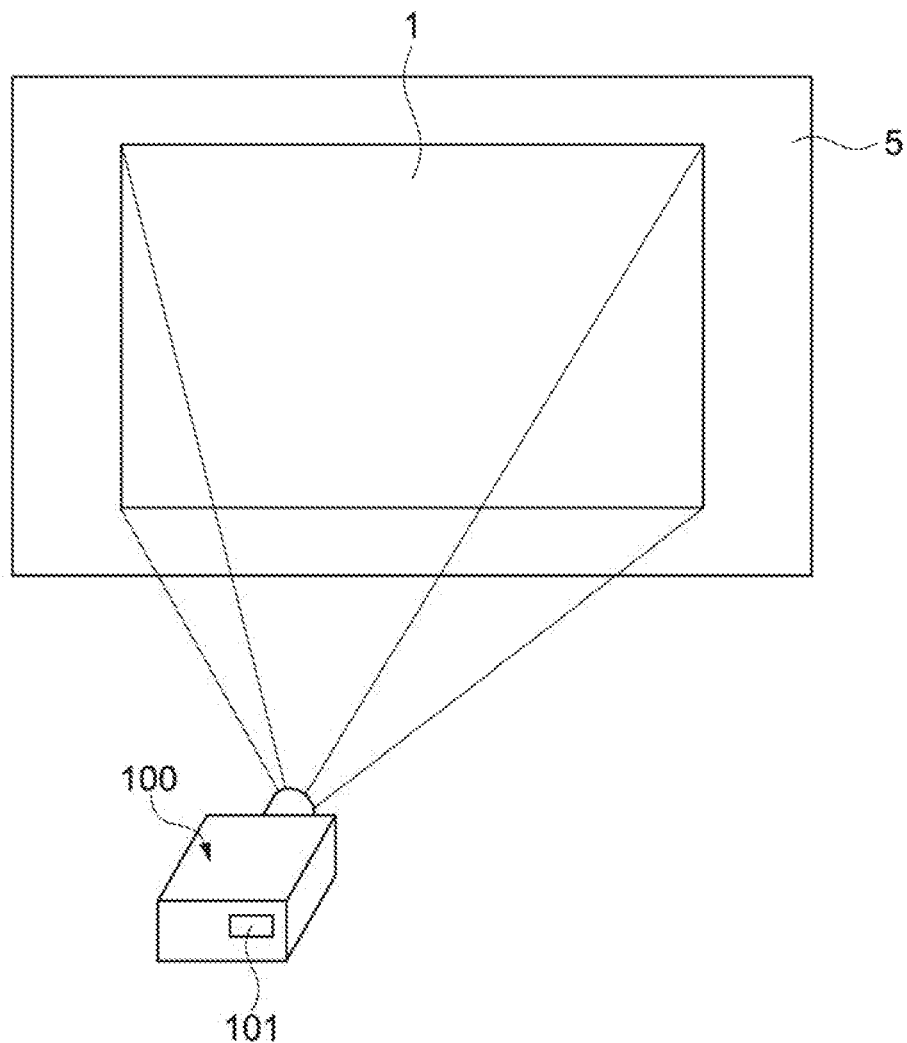
FIG. 1 A diagram schematically showing an image projection by an image display apparatus according to a first embodiment.

FIG. 1 is a diagram schematically showing an image projection by an image display apparatus according to a first embodiment of the present technology. An image display apparatus 100 is used as a projector for presentations or digital cinema, for example. The present technology is also applicable to projectors used for other purposes and image display apparatuses excluding the projector.

As shown in FIG. 1, the image display apparatus 100 includes an input interface 101 equipped with an HDMI (registered trademark) (High-Definition Multimedia Interface) terminal and the like and a WiFi module and the like, for example. Image information is input to the input interface 101 via wires or wirelessly from an image supply source (not shown) such as a PC, for example. The image display apparatus 100 generates an image 1 on the basis of input image information and projects it onto a projection surface 5 such as a screen.

Figure 2:
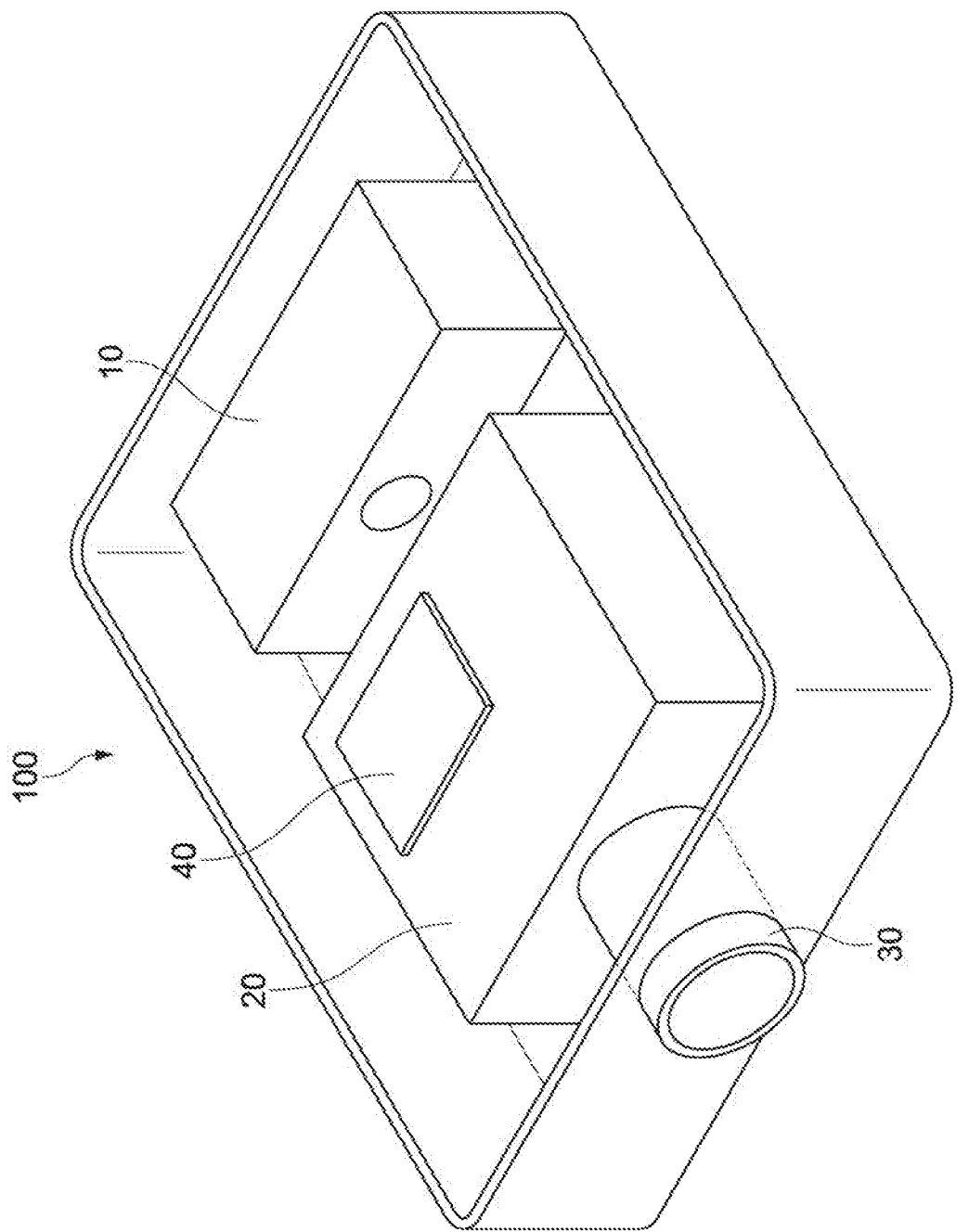
FIG. 2 A schematic diagram showing an internal configuration example of the image display apparatus.

FIG. 2 is a schematic diagram showing an internal configuration example of the image display apparatus 100. The image display apparatus 100 includes a light source unit 10, a light modulation unit 20, a projection unit 30, and a display control unit 40. The light source unit 10 typically generates white light and emits it to the light modulation unit 20. A solid-state light source such as an LED (Light Emitting Diode) and an LD, a mercury lamp, a xenon lamp, or the like is arranged in the light source unit 10, for example.

The light modulation unit 20 generates the image 1 by modulating light from the light source unit 10. The light modulation unit 20 includes, for example, an integrator device, a polarization conversion device, a split optical system that splits white light into light of 3 colors of RGB, 3 light modulation devices that modulate light of the respective colors, a synthesis optical system that synthesizes the modulated light of the respective colors, and the like. Specific configurations of these members and optical systems are not limited.

The projection unit 30 includes a plurality of lenses and projects the image 1 generated by the light modulation unit 20 onto the projection surface 5. The configuration of the projection unit 30 is not limited, and an arbitrary configuration may be adopted as appropriate. In this embodiment, an image projection unit is realized by the light source unit 10, the light modulation unit 20, and the projection unit 30.

The display control unit 40 controls operations of respective mechanisms of the image display apparatus 100. The display control unit 40 also executes various types of processing on image information input from the input interface 101.

The display control unit 40 includes, for example, a CPU (Central Processing Unit), a RAM (Random Access Memory), a ROM (Read Only Memory), and the like and executes various types of processing by the CPU loading programs recorded in advance in the ROM in the RAM and executing them. It should be noted that the configuration of the display control unit 40 is not limited, and arbitrary hardware and software may be used as appropriate.

(Image Display Method)

Figure 3:
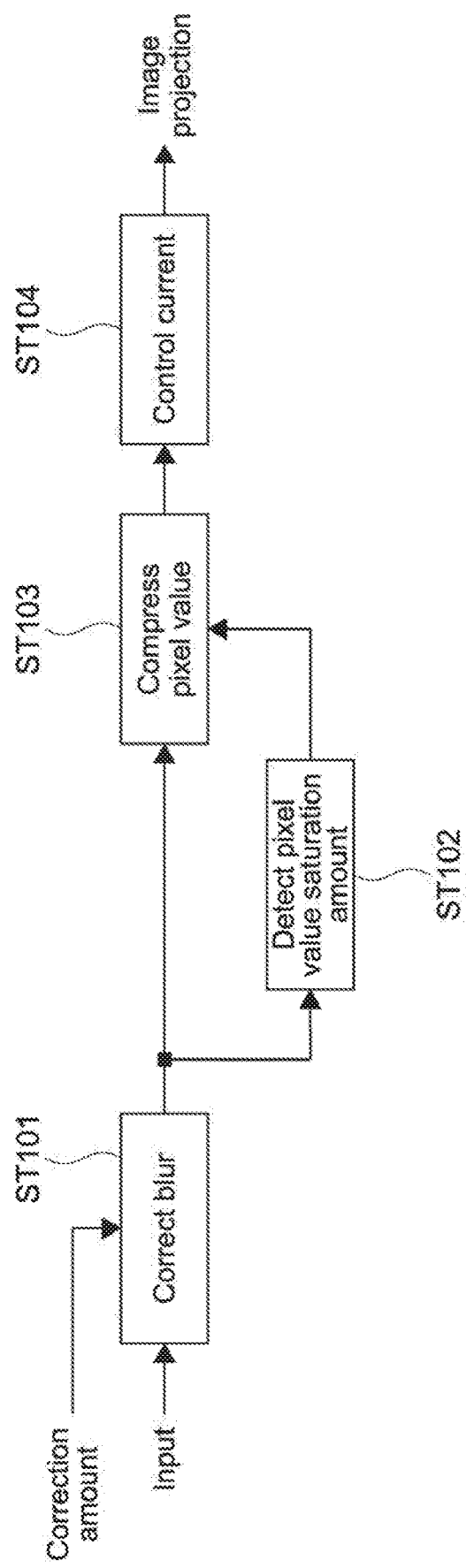
FIG. 3 A block diagram showing an image display processing example according to the first embodiment.
Figure 4A:
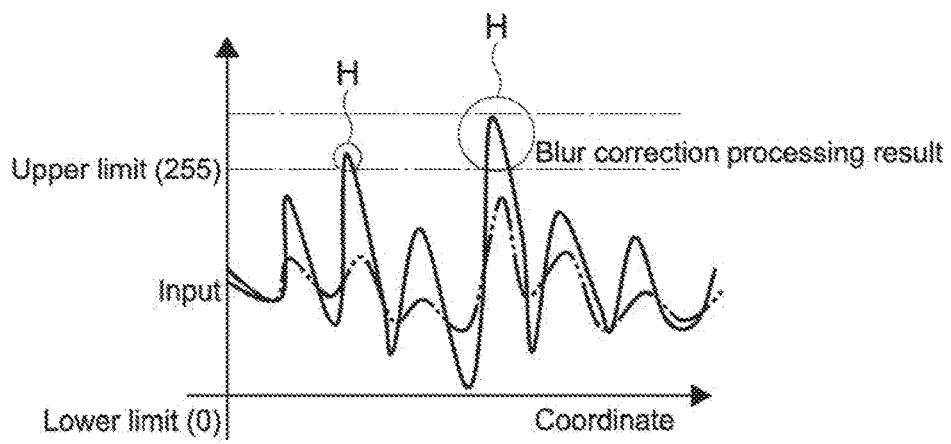
FIGS. 4A, 4B and 4C Diagrams for explaining steps of the processing shown in FIG. 3, the graphs schematically showing input image signals.
Figure 4B:
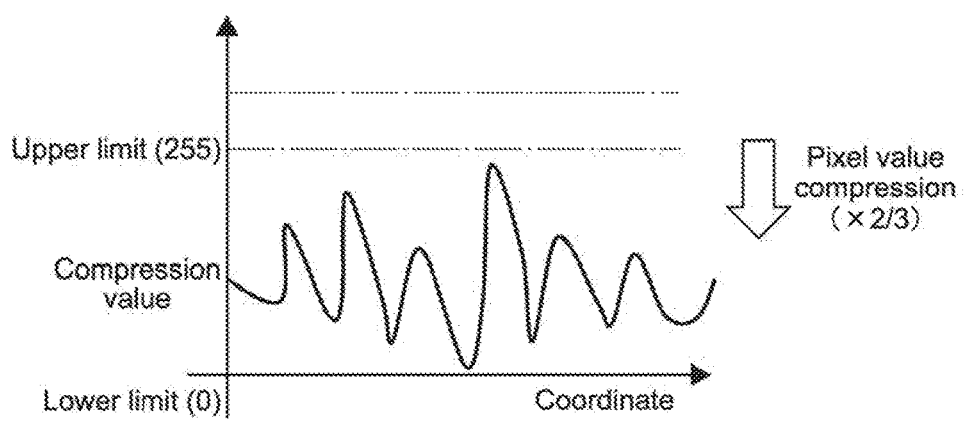
Figure 4C:
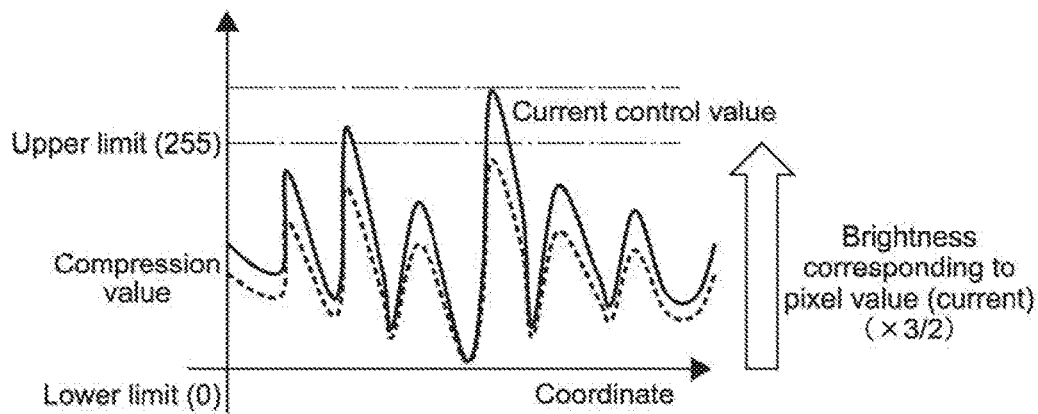

FIG. 3 is a block diagram showing an image display processing example according to this embodiment. FIGS. 4A, 4B and 4C are diagrams for explaining steps of the processing shown in FIG. 3, the graphs schematically showing input image signals. In FIGS. 4A, 4B and 4C, the abscissa axis represents pixel coordinates, and the ordinate axis represents a pixel value of each pixel (also referred to as luminance value or gradation value).

In this embodiment, 8-bit pixel values with which a lower limit value becomes 0 and an upper limit value becomes 255 are used, though of course not limited thereto. For example, 10-bit pixel values from 0 to 1023 may be used instead. The present technology is also applicable to a case where pixel values are determined by other bit counts.

By the display control unit 40, pixel values of respective pixels included in the input image information are corrected. Specifically, in this embodiment, the display control unit 40 also functions as a correction unit, and the pixel values of the respective pixels are corrected for correcting deterioration of the image 1 to be projected onto the projection surface 5 on the basis of the input image information (Step 101).

For example, deterioration such as a blur may be caused in the projected image 1 due to performance of optical devices such as a lens and a mirror arranged in the light modulation unit 20 and the projection unit 30, a shape of the projection surface 5 on which the image 1 is displayed, and the like. The pixel values are corrected on the basis of a predetermined correction amount for correcting this deterioration such as a blur.

For example, a PSF (Point spread function) is calculated for each pixel of the image 1 to be projected, and an inverse filter calculation that uses the PSF is executed. In this case, the inverse filter coefficient or the like becomes the predetermined correction amount shown in FIG. 3. It should be noted that the PSF calculation method is not limited, and the PSF is calculated by projecting a predetermined correction image and photographing and analyzing the correction image, for example. Alternatively, the PSF may be calculated on the basis of a design value of the image display apparatus 100. Alternatively, the PSF may be calculated on the basis of a user input and the like. It should be noted that other algorithms and the like may be adopted as a method of correcting a blur and the like.

The display control unit 40 detects a pixel whose pixel value exceeds an upper limit value and a saturation amount thereof (run-over amount from upper limit) (Step 102). The graph of the two-dot chain line shown in FIG. 4A is a waveform of input original image signals, that is, pixel values before correction (hereinafter, referred to as input pixel values). The graph of the solid line shows corrected image signals, that is, a corrected pixel value of each pixel. Parts indicated by a symbol H in the corrected waveform are pixel values of pixels exceeding the upper limit value 255.

Hereinafter, a pixel whose pixel value exceeds the upper limit value 255 by the correction will be referred to as saturation pixel, and a pixel value exceeding the upper limit value 255 will be referred to as saturation pixel value. Therefore, the saturation amount becomes a difference between the saturation pixel value and the upper limit value 255.

The pixel values from 0 to 255 are within a range of pixel values expressible by the light modulation unit 20. Therefore, as the saturation pixel value exceeding the upper limit value 255 is input to the light modulation unit 20, an artifact or the like may be caused in the projection image 1 to thus cause image deterioration, for example.

In this regard, in this embodiment, the display control unit 40 changes the saturation pixel value to a value equal to or smaller than the upper limit value 255. As shown in Step 103 of FIG. 3 and FIG. 4B, in this embodiment, each of the pixel values including unsaturated pixel values is reduced by a predetermined ratio. Specifically, the corrected pixel values are compressed as a whole by a predetermined ratio.

The compression ratio is not limited, and a predetermined value such as ⅔ may be preset as the compression ratio as shown in FIG. 4B, for example. Alternatively, a ratio by which the most-saturated saturation pixel value becomes a value equal to or smaller than the upper limit value 255 may be calculated every time.

The display control unit 40 controls the light source unit 10 to increase output luminance of the light source unit 10.

Typically, by controlling a current to be applied to the light source of the light source unit 10, luminance of light output from the light source unit 10 is controlled (Step 104). It should be noted that the method of increasing output luminance of the light source unit 10 is not limited.

As the output luminance of the light source unit 10 is increased, display luminance of each pixel within the projection image 1 (light intensity of each pixel displayed on projection surface 5) increases. In FIG. 4C, compressed pixel values are indicated by the graph in a broken line, and pixel values increased by current control are indicated by a solid line.

By increasing the output luminance of the light source unit 10 by current control, it becomes possible to express saturation pixel values exceeding the upper limit value 255. As a result, a blur or the like due to performance of the projection unit 10 and the like within the image 1 to be projected is sufficiently corrected, and a high-quality image true to original image information is projected. In this way, the present technology is contrived on the basis of a new technological idea of preventing deterioration such as a blur by brightening the projection image 1.

The output luminance of the light source unit 10 is increased by a ratio that becomes a reciprocal number of the ratio by which the pixel values are compressed in Step 103, for example (e.g., ratio of ½ shown in FIG. 4C). Accordingly, it becomes possible to project a high-quality image substantially comparable to the original image information, though of course not limited thereto.

Further, assuming that the display luminance can be controlled for each pixel configuring the image 1 by the current control or the like, in this case, control is executed for each pixel such that an increase amount becomes equal to the compression amount of Step 103. Accordingly, it becomes possible to completely reproduce the original image information.

Further, a certain value may be subtracted from the corrected pixel values as a whole within a range where a pixel that falls below the lower limit value 0 is not generated, in place of the compression processing of Step 103. Then, the output luminance of the light source unit 10 may be increased as a whole such that an increase amount becomes equal to the subtraction amount by the current control of Step 104. Also by this method, it becomes possible to project a high-quality image without a blur or the like.

It should be noted that in a case where a saturation pixel is not detected in Step 102, the image compression and current control are not executed, and the image 1 is generated and projected on the basis of corrected pixel values.

Second Embodiment

An image display apparatus according to a second embodiment of the present technology will be described. In descriptions below, descriptions on configurations and operations similar to those of the image display apparatus 100 described in the embodiment above will be omitted or simplified.

Figure 5:
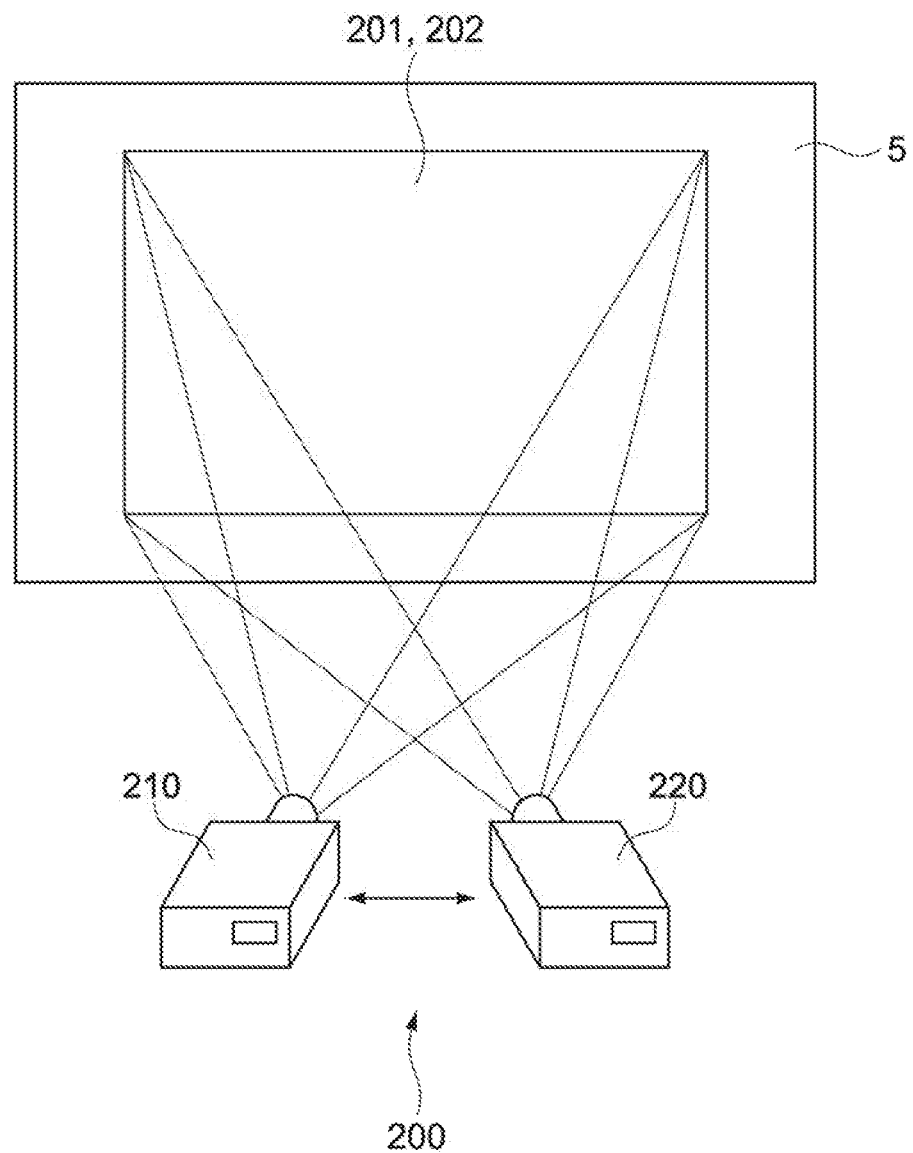
FIG. 5 A diagram schematically showing an image projection by an image display apparatus according to a second embodiment.

FIG. 5 is a diagram schematically showing an image projection by the image display apparatus according to the second embodiment. The image display apparatus 200 is configured by two image display apparatuses, that is, a main projector 210 and a sub-projector 220. An image projection unit of the main projector 210 becomes a main image projection unit, and an image projection unit of the sub-projector 220 becomes a sub-image projection unit.

The main projector 210 and the sub-projector 220 are capable of mutually communicating with each other via wires or wirelessly. In this embodiment, operations of the sub-projector 220 are controlled by a display control unit of the main projector 210. It should be noted that the two image projection units may be accommodated in one casing. In this case, a light source unit and the like may be used in common.

The number of the plurality of image projection units configuring the image display apparatus is not limited. For example, 3 or more projectors may be used while being aligned.

As shown in FIG. 5, a projection position of an image 201 projected by the main projector 210 and a projection position of an image 202 projected by the sub-projector 220 are set to be mutually the same. Therefore, the images 201 and 202 are displayed while overlapping each other.

In this embodiment, a resolution of the image 201 projectable by the main projector 210 and a resolution of the image 292 projectable by the sub-projector 220 are mutually the same. Therefore, pixels located at the same position in the images 201 and 202 overlap each other. It should be noted that the projection positions of the images 201 and 202 can be controlled with accuracy of a pixel size or less by using a well-known technology, for example.

Figure 6:
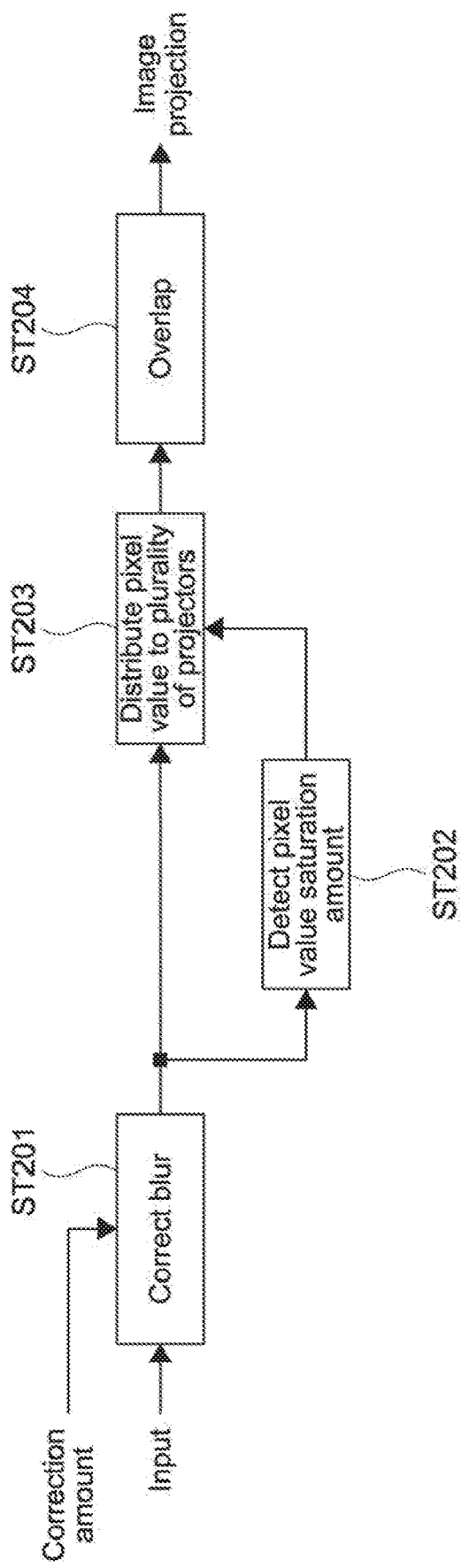
FIG. 6 A block diagram showing an image display processing example according to the second embodiment.
Figure 7A:
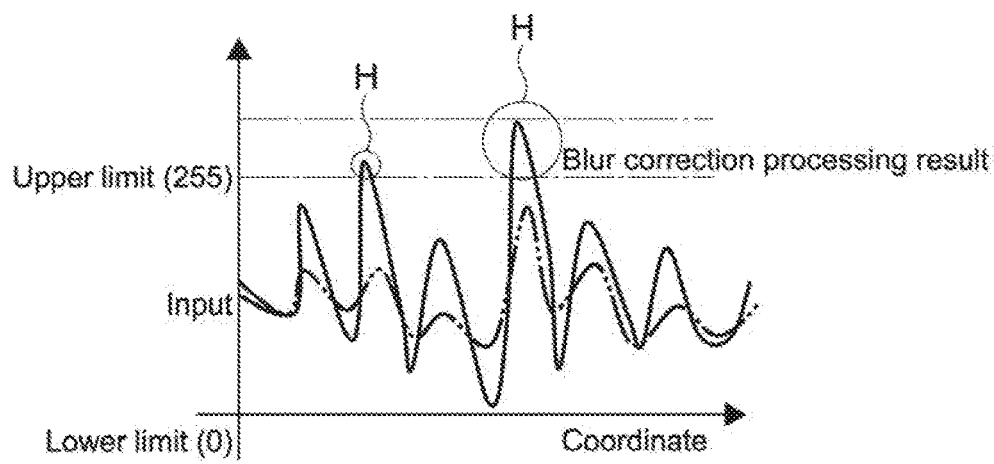
FIGS. 7A, 7B and 7C Diagrams for explaining steps of the processing shown in FIG. 6, the graphs schematically showing input image signals.
Figure 7B:
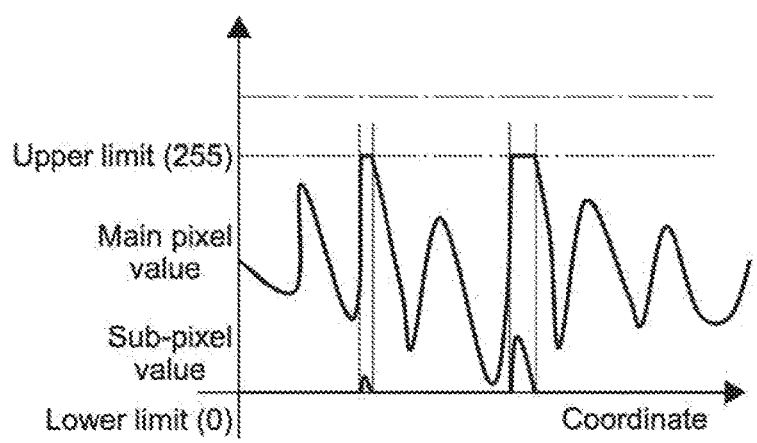
Figure 7C:
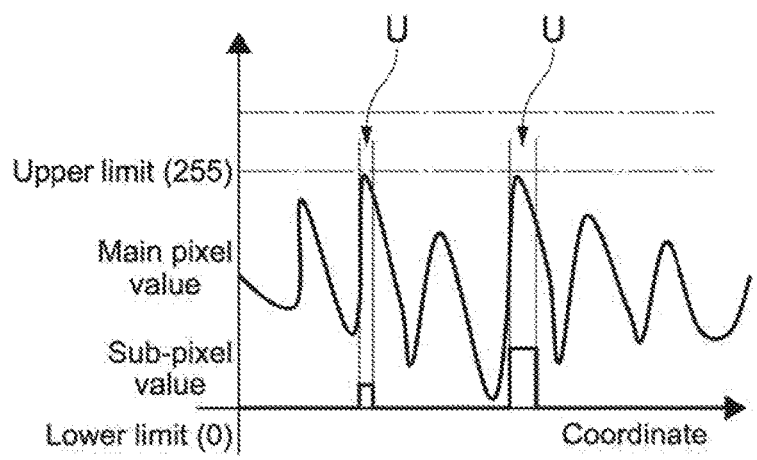

FIG. 6 is a block diagram showing an image display processing example according to this embodiment. FIGS. 7A, 7B and 7C are diagrams for explaining steps of the processing shown in FIG. 6, the graphs schematically showing input image signals.

As shown in Steps 201 and 202 of FIG. 6 and FIG. 7A, a correction of input pixel values and a detection of saturation amounts of image values are executed. Next, distribution of pixel values is executed with respect to the main projector 210 and the sub-projector 220. Specifically, a saturation pixel value exceeding the upper limit value 255 is distributed to a plurality of distribution pixel values, and the pixel values are output to the main image projection unit of the main projector 210 and the sub-image projection unit of the sub-projector 220 (Step 203).

A distribution pixel value output to the main image projection unit will be referred to as main distribution pixel value, and a distribution pixel value output to the sub-image projection unit will be referred to as sub-distribution pixel value. The "upper limit value 255" is set as the main distribution pixel value, for example. The "difference between saturation pixel value and upper limit value 255" is set as the sub-distribution pixel value. Therefore, if the corrected saturation pixel value is 275, the main distribution pixel value becomes 255, and the sub-distribution pixel value becomes 20.

For example, as shown in FIG. 7B, pixel values of pixels that do not become saturation pixels and the upper limit value 255 as the main distribution pixel value are output to the main projector 210. (Main pixel value). On the other hand, regarding a pixel that does not become a saturation pixel and the saturation pixel, a pixel value 0 and a value obtained by subtracting the upper limit value 255 from the saturation pixel value are respectively output to the sub-projector 220 (sub-pixel value).

On the basis of the respective output pixel values, the images 201 and 202 are projected from the respective projectors while overlapping each other (Step 204). By using the plurality of image projection units in this way, it becomes possible to easily express the saturation pixel values and sufficiently correct deterioration such as a blur.

How to distribute saturation pixel values is not limited. The distribution method may be set as appropriate so that a high-quality image is projected. Moreover, it is also possible to distribute pixel values of pixels that do not become saturation pixels and cause images to overlap each other by the two projectors 210 and 220.

A projector having a lower resolution than the main projector 210 may be used as the sub-projector 220. Accordingly, it becomes possible to use an inexpensive sub-projector 220 having a low resolution and suppress costs.

FIG. 7C is a graph showing an example of the pixel value distribution method in this case. For example, assuming that pixels within saturation ranges U in FIG. 7C are saturation pixels, only a certain value is subtracted from the saturation pixel values. Then, a range including the saturation ranges U is projected by the sub-projector 220 having a low resolution on the basis of the pixel values obtained as a result of the subtraction. Accordingly, a high-quality image substantially comparable to an original image can be projected. It should be noted that the subtraction amount and a magnitude of additional pixel values are not limited.

Figure 8:
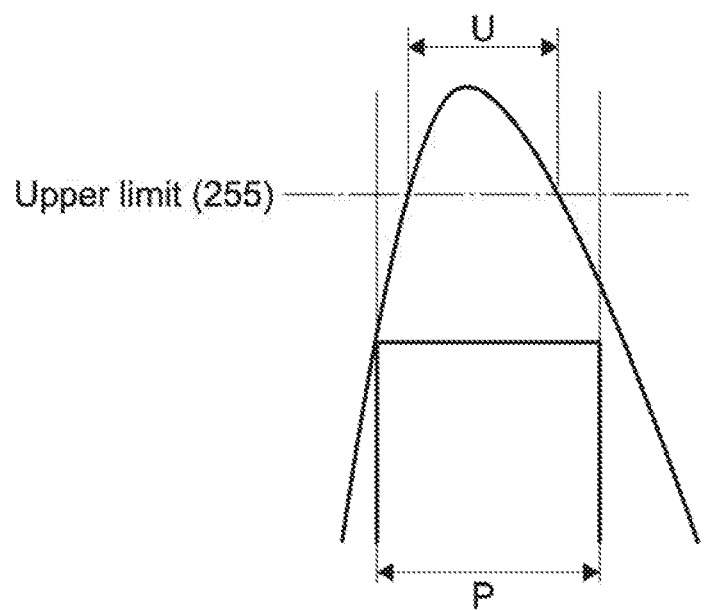
FIG. 8 A diagram for explaining an example of a pixel value distribution method in a case where a low-resolution sub-projector is used.

FIG. 8 is a diagram for explaining another example of the pixel value distribution method in a case where the low-resolution sub-projector 220 is used. In a case where the sub-projector 220 has a low resolution, the saturation range U and a range P where pixel values can be added by the sub-projector 220 may not coincide with each other. For example, it is assumed that the pixel size of the low-resolution sub-projector 220 is larger than that of the high-resolution main projector 210. In this case, the saturation range U that becomes an integral multiple of the pixel size of the main projector 210 and the range P that becomes an integral multiple of the pixel size of the sub-projector 220 differ from each other.

Considering this point, regarding the pixel values input to the main projector 210, only a certain value may be subtracted from pixel values of not only the saturation range U but also a range that coincides with the addable range P of pixel values of the sub-projector 220. As a result, by the pixel values being added by the sub-projector 220, an image can be reproduced with high accuracy in the addable range P.

The maximum luminance that can be output by the sub-projector 220 may be limited. Specifically, power to be supplied to the light source unit of the sub-projector 220 is limited, and pixel values may be distributed within that limited range. By suppressing power consumption in this way, costs can be suppressed.

The limitation on the resolution and the limitation on power consumption of the sub-projector 220 may be set as optimization restrictions in calculating a correction amount used for the blur correction in Step 201. In other words, an optimal correction amount with which a difference from the original image becomes minimum may be calculated with the limitations on the resolution and power consumption being restriction conditions.

Third Embodiment

Figure 9:
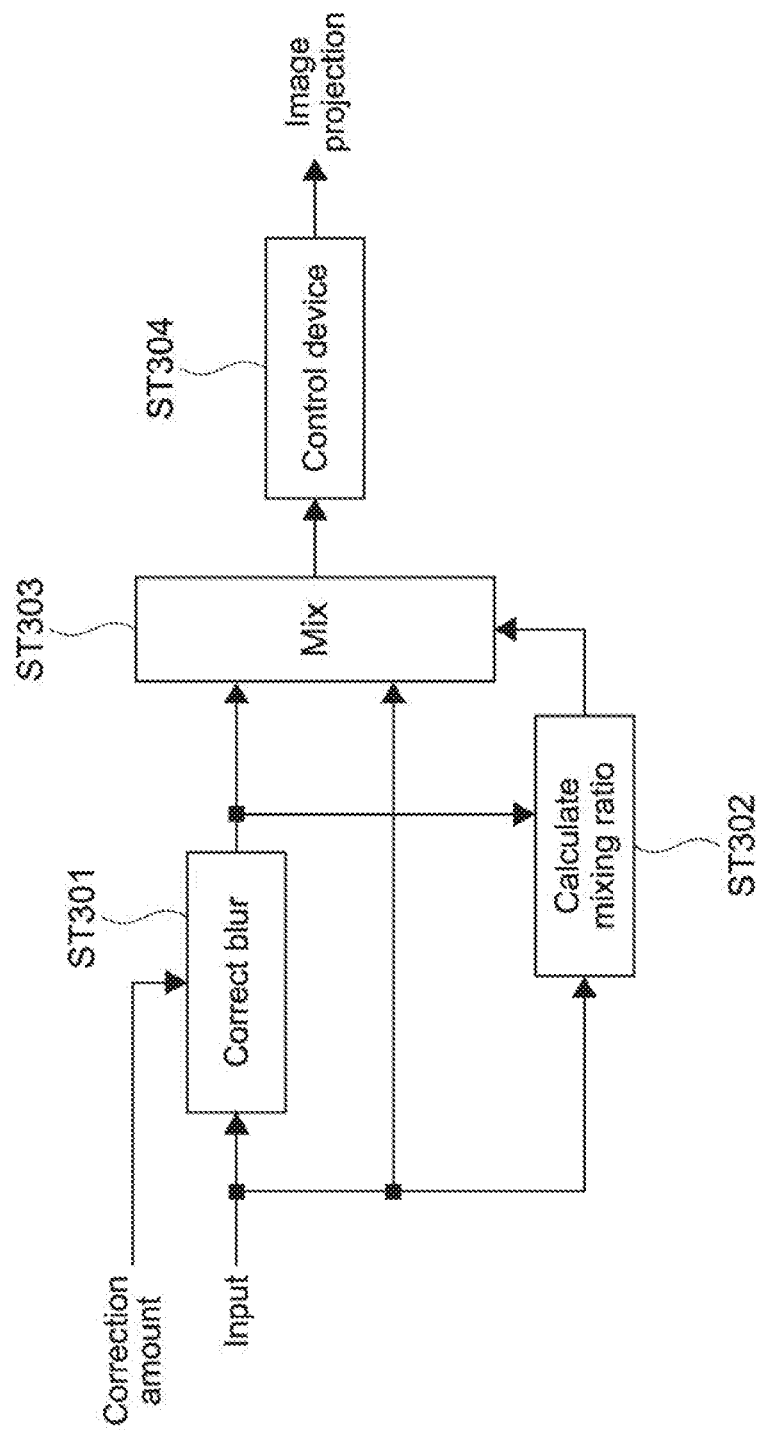
FIG. 9 A block diagram showing an image display processing example according to a third embodiment.
Figure 10:
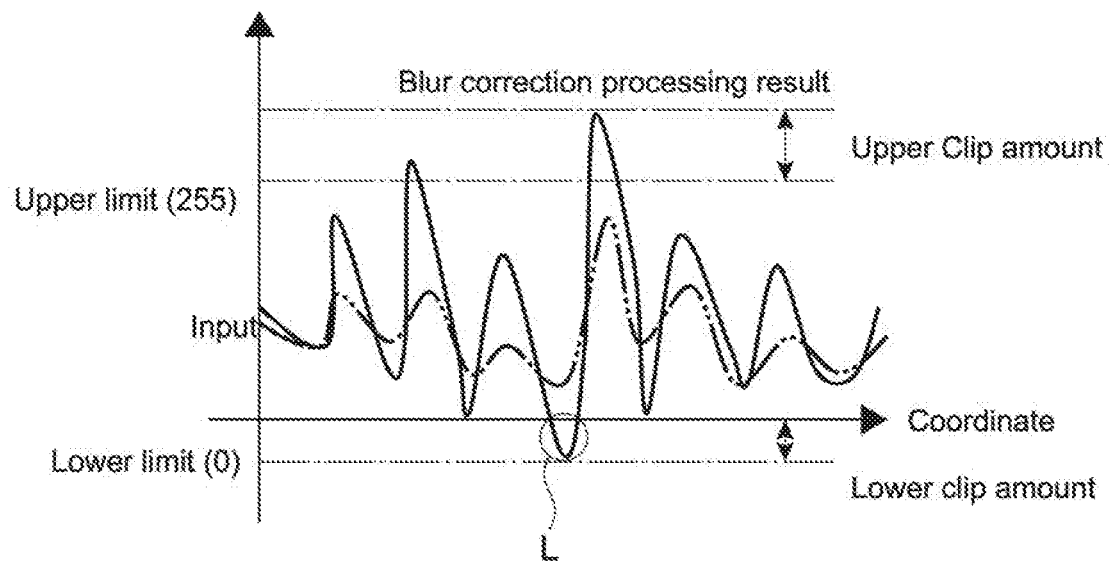
FIG. 10 A diagram for explaining steps of the processing shown in FIG. 9, the graph schematically showing input image signals.

FIG. 9 is a block diagram showing an image display processing example according to a third embodiment of the present technology. FIG. 10 is a diagram for explaining steps of the processing shown in FIG. 9, the graph schematically showing input image signals.

In this image display apparatus, regarding a pixel whose pixel value falls below the lower limit value 0 (hereinafter, referred to as insufficient pixel), an insufficient pixel value that falls below the lower limit value 0 is set to come close to the pixel value before being corrected, by the blur correction of Step 301. In other words, the insufficient pixel value of a part indicated by a symbol L in FIG. 10 is set to come close to the input pixel value.

Therefore, in this embodiment, a mixing ratio is calculated, and mixing of pixel values is executed on the basis of this mixing ratio (Steps 302 and 303). Specifically, the mixing is executed using the following expression.

Insufficient pixel value*mixing ratio+input pixel value*(1-mixing ratio)

It should be noted that the mixing ratio is a value that is 0 or more and 1.0 or less.

Figure 11:
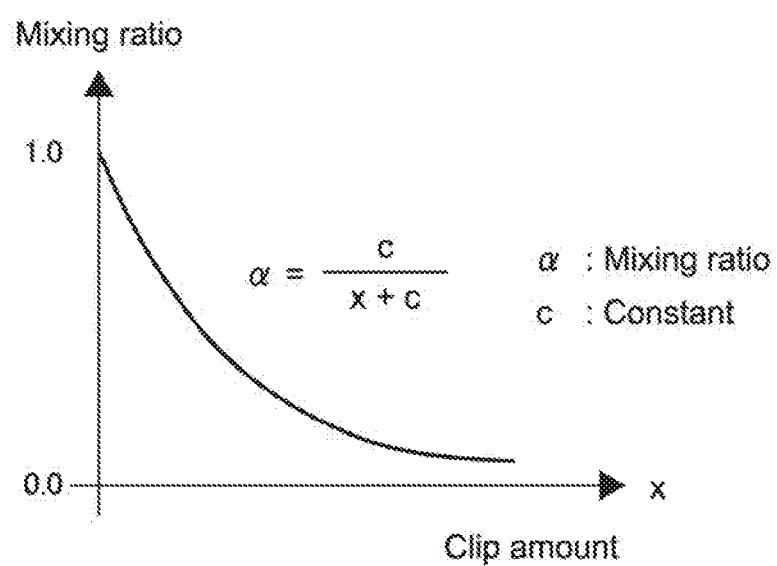
FIG. 11 A graph for explaining a calculation example of a mixing ratio.

The mixing ratio is calculated by the following expression, for example, on the basis of a magnitude of a difference between the lower limit value 0 and the insufficient pixel value (absolute value). FIG. 11 shows a graph that uses this expression.

Mixing ratio=$C/(x+C)$

C . . . constant
x . . . magnitude of difference between lower limit value 0 and insufficient pixel value; hereinafter, referred to as lower clip amount As shown in FIG. 11, as the lower clip amount becomes larger, the mixing ratio becomes smaller. In other words, as the lower clip amount becomes larger, a ratio by which the insufficient pixel value is subjected to mixing becomes smaller, to thus come closer to the input pixel value. By executing mixing by a ratio corresponding to the difference between the lower limit value 0 and the insufficient pixel value in this way, it becomes possible to prevent, while preventing generation of insufficient pixel values, image quality from being lowered due to the correction of insufficient pixel values. In other words, it becomes possible to correct the insufficient pixel values such that a waveform thereof becomes substantially the same as that of input pixel values. It should be noted that the mixing ratio calculation method and the mixing method are not limited.

As shown in FIG. 9, after mixing is executed, device control is executed (Step 304). This device control refers to the pixel value compression and current control described in the first embodiment or the pixel value distribution and image overlapping by the plurality of projectors that have been described in the second embodiment. In other words, by executing the technology according to this embodiment, it becomes possible to suppress insufficient pixels that cannot be coped with by device control from being generated.

Regarding saturation pixel values exceeding the upper limit value 255 in FIG. 10, it is also possible to calculate a mixing ratio corresponding to the saturation amounts (referred to as upper clip amount in FIG. 10) and execute mixing such that the saturation pixel values come close to input pixel values. For example, by executing mixing corresponding to the upper clip amount in a case where the saturation pixel value has become too large or the like, a high-quality image can be projected.

In the processing shown in FIG. 9, the mixing ratio is calculated on the basis of insufficient pixel values calculated as a result of the blur correction, to thus execute mixing of pixel values. Instead of this, insufficient pixel values may be predicted on the basis of input pixel values to be input and the correction amount before executing the blur correction. Then, mixing may be executed on the basis of the predicted insufficient pixel values.

For example, it is possible to predict insufficient pixel values on the basis of an amplitude of input pixel values (dynamic range), a position of a prediction target pixel, and the like. Moreover, insufficient pixel values may also be predicted on the basis of a PSF, amplitude, and the like of pixels within a predetermined range about a prediction target pixel. By predicting insufficient pixel values and calculating the mixing ratio before the blur correction, a processing time can be shortened. Further, an output delay of frame images when projecting a video and the like can be prevented from occurring.

When image information is input, an input pixel value of each pixel included in the image information may be increased only by a certain value as a whole. Specifically, the waveform of input pixel values shown in FIG. 10 may be raised upwardly before the blur correction or mixing ratio calculation. Accordingly, it is possible to additionally suppress generation of insufficient pixels due to the correction.

Fourth Embodiment

Figure 12:
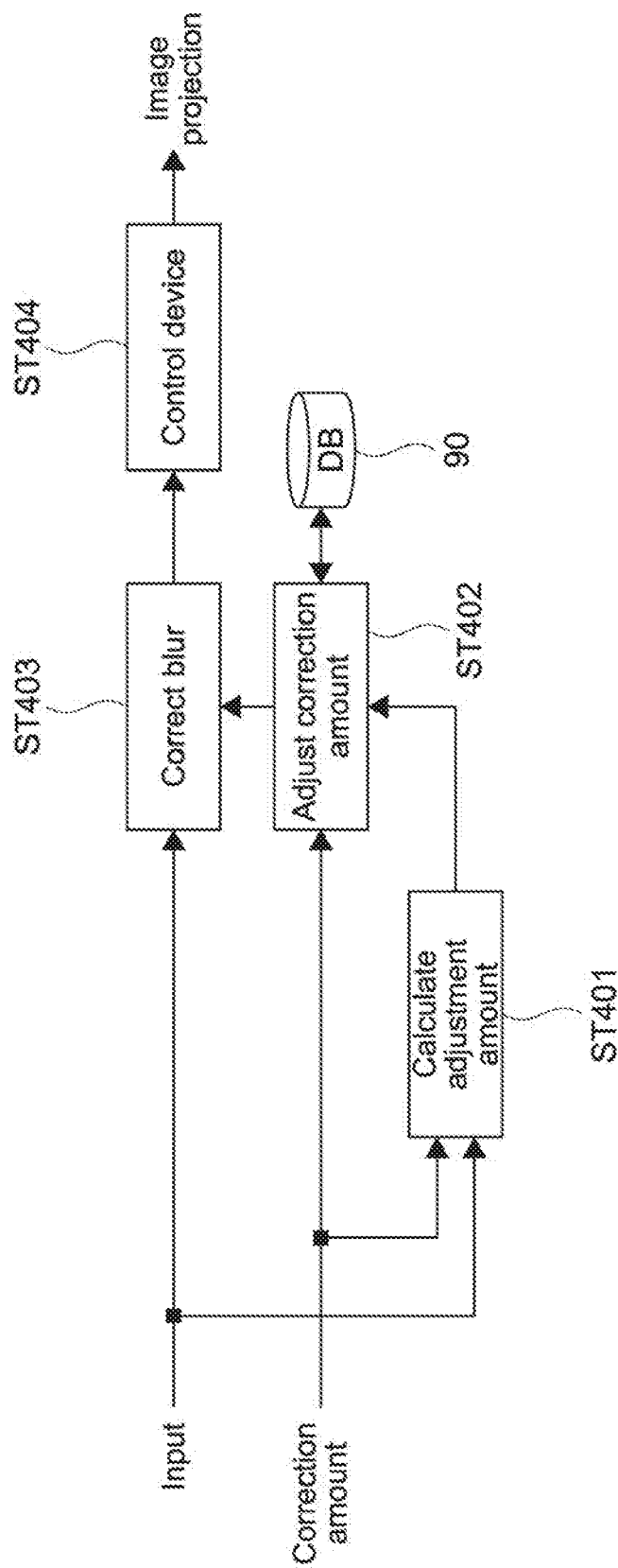
FIG. 12 A block diagram showing an image display processing example according to a fourth embodiment.

FIG. 12 is a block diagram showing an image display processing example according to a fourth embodiment of the present technology. In this image display apparatus, an adjustment amount for adjusting a correction intensity in executing a blur correction of Step 403 is calculated on the basis of a predicted insufficient pixel value (Step 401). A correction amount read out from a database 90 is adjusted, that is, a correction intensity is adjusted, on the basis of the calculated adjustment amount (Step 402). An input pixel value is corrected by the adjusted correction intensity (Step 403), and device control is executed (Step 404).

Figure 13:
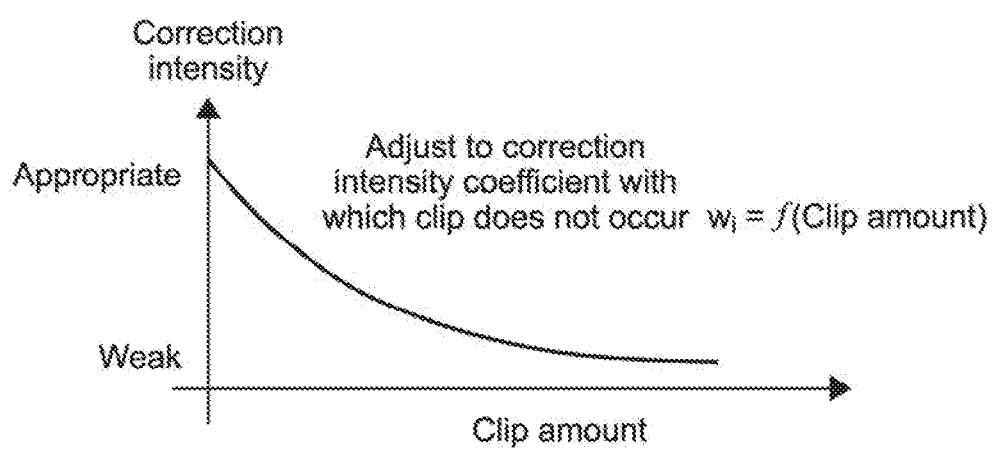
FIG. 13 A graph for explaining an example of a correction intensity adjustment method.

FIG. 13 is a graph for explaining an example of a correction intensity adjustment method. For example, the correction intensity is determined in accordance with a clip amount on the basis of a function expressed by the graph shown in FIG. 13. Although the function is not limited to this, the correction intensity is typically suppressed to become smaller as the clip amount becomes larger as shown in FIG. 13. Accordingly, it becomes possible to suppress generation of insufficient pixels. It should be noted that in a case where the clip amount is 0, the blur correction is executed with an appropriate preset intensity.

The method of adjusting a correction intensity is not limited, and in a case where the PSF is approximated by a 2-dimensional Gauss function, for example, a σ value of the Gauss function is adjusted. Alternatively, a PSF coefficient may be adjusted by a bilateral weight multiplication.

It is also possible for a set of a plurality of correction amounts of different correction intensities to be stored in the database 90 so that a correction amount to become a correction intensity after the adjustment is selected from that set. The set of correction amounts may be set for each lineup of image display apparatuses. On the other hand, it is also possible for the database 90 that stores correction amounts to not be provided and the correction amount to be calculated as appropriate for the blur correction to be adjusted every time. Furthermore, the correction amount may be adjusted by a user operation made via GUIs.

Other Embodiments

The present technology is not limited to the embodiments described above, and various other embodiments can be realized.

Figure 14:
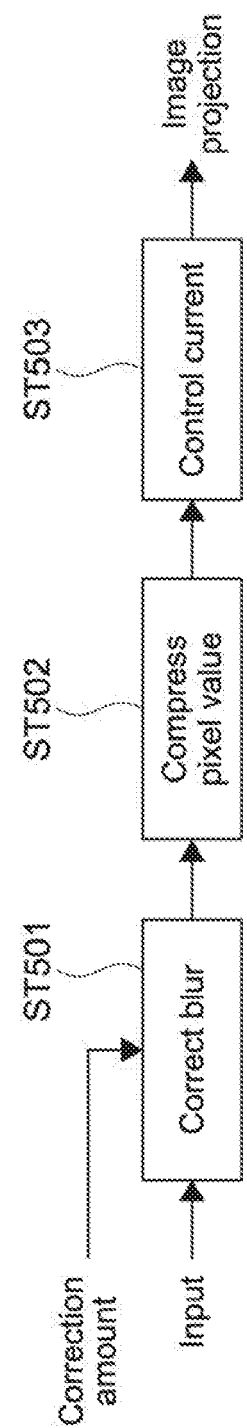
FIG. 14 A block diagram showing an image display processing example according to another embodiment.

FIG. 14 is a block diagram showing an image display processing example according to another embodiment. The image display shown in FIG. 14 can also be referred to as modified example of the image display according to the first embodiment, and pixel value compression and current control are executed without detecting a saturation amount shown in Step 102 of FIG. 3 after the blur correction (Steps 501-503). In other words, in this embodiment, the pixel value compression and current control are constantly executed on corrected image information. As a result, it is possible to realize simplification of the configuration and processing of the display control unit, shortening of a processing time, reduction of costs, and the like.

The processing on the image information that has been described in the respective embodiments above only needs to be executed for images of light of the respective colors of RGB. Accordingly, a high-quality color image can be projected.

It is also possible for a computer such as a PC to be connected to the image display apparatus 100 shown FIG. 1 or the main projector 210 and sub-projector 220 shown in FIG. 5 so that the computer executes signal processing such as the correction of input pixel values, the device control described above, and the like. In this case, the computer functions as an information processing apparatus according to the present technology.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) An image display apparatus, including:
a correction unit that corrects, for correcting deterioration of an image to be projected on the basis of image information including a pixel value of each pixel, the pixel value of each pixel included in the image information; and
a display control unit that changes, for a pixel whose pixel value exceeds an upper limit value by the correction, the pixel value to a value equal to or smaller than the upper limit value and increases display luminance of the pixel exceeding the upper limit value within the image to be projected.

(2) The image display apparatus according to (1), further including
an image projection unit including
a light source unit,
a light modulation unit that generates an image by modulating light from the light source unit, and
a projection unit that projects an image generated by the light modulation unit,
in which the display control unit reduces the pixel value of the pixel exceeding the upper limit value and increases output luminance of the light source unit.

(3) The image display apparatus according to (2), in which
the display control unit reduces the pixel value of the pixel exceeding the upper limit value by a predetermined ratio and increases the output luminance of the light source unit by a ratio which becomes a reciprocal number of the predetermined ratio.

(4) The image display apparatus according to (1), further including
a plurality of image projection units that generate and project images,
in which the display control unit distributes, for the pixel exceeding the upper limit value, the pixel value to a plurality of distribution pixel values and causes the plurality of image projection units to project on the basis of the plurality of distribution pixel values.

(5) The image display apparatus according to (4), in which the plurality of image projection units include a main image projection unit and a sub-image projection unit, and the display control unit outputs the upper limit value to the main image projection unit and outputs a difference between the pixel value of the pixel exceeding the upper limit value and the upper limit value to the sub-image projection unit.

(6) The image display apparatus according to (4) or (5), in which the plurality of image projection units include a main image projection unit and a sub-image projection unit, and a resolution of an image projectable by the sub-image projection unit is lower than that of an image projectable by the main image projection unit.

(7) The image display apparatus according to any one of (4) to (6), in which the plurality of image projection units include a main image projection unit and a sub-image projection unit, and maximum luminance that the sub-image projection unit is capable of outputting is lower than that which the main image projection unit is capable of outputting.

(8) The image display apparatus according to any one of (1) to (7), in which the display control unit sets, for a pixel whose pixel value falls below a lower limit value by the correction, the pixel value to become close to a pixel value obtained before the correction.

(9) The image display apparatus according to (8), in which the display control unit changes the pixel value of the pixel falling below the lower limit value to a value obtained by adding the lower limit value and the pixel value of the pixel falling below the lower limit value by a ratio corresponding to a difference between those values.

(10) The image display apparatus according to any one of (1) to (9), in which the display control unit outputs the pixel value of each pixel included in the image information to the correction unit while increasing the pixel value of each pixel only by a certain value.

(11) The image display apparatus according to any one of (1) to (10), in which the correction unit adjusts, for a pixel whose pixel value falls below a lower limit value by the correction, a correction intensity of a pixel value obtained before the correction in accordance with a difference between the lower limit value and the pixel value of the pixel falling below the lower limit value, and corrects the pixel value obtained before the correction by the adjusted correction intensity.

REFERENCE SIGNS LIST 1, 202, 202 image
10 light source unit
20 light modulation unit
30 projection unit
40 display control unit
100, 200 image display apparatus
101 input interface
210 main projector
220 sub-projector

The invention claimed is:

1. An image display apparatus, comprising:
a light source unit;
a correction unit configured to correct deterioration of an image to be projected based on image information including a plurality of pixel values of a plurality of pixels, wherein the deterioration is corrected by correction of each pixel value of the plurality of pixel values;
a display control unit configured to:
detect a first pixel of the plurality of pixels, wherein a first pixel value of the first pixel exceeds an upper limit value based on the correction of the plurality of pixel values;
determine a saturation amount of the first pixel based on a difference between the first pixel value of the first pixel and the upper limit value;
generate a second pixel value of the first pixel based on the saturation amount of the first pixel, wherein the second pixel value of the first pixel is equal to or smaller than the upper limit value; and
increase output luminance of the light source unit to increase display luminance of the first pixel having the generated second pixel value; and
a plurality of image projection units configured to generate and project a plurality of images, wherein
the plurality of image projection units include a main image projection unit and a sub-image projection unit, and
the display control unit is further configured to:
distribute the first pixel value of the first pixel to a plurality of distribution pixel values;
output the upper limit value to the main image projection unit;
output the saturation amount of the first pixel to the sub-image projection unit; and
control the plurality of image projection units to project the plurality of images based on the plurality of distribution pixel values, the output of the upper limit value, and the output of the saturation amount, wherein a plurality of projection positions of the plurality of images are identical.

2. The image display apparatus according to claim 1, wherein each of the plurality of image projection units includes:
a light modulation unit configured to generate the image based on modulation of light from the light source unit; and
a projection unit configured to project the image generated by the light modulation unit, and
the display control unit is further configured to:
reduce the first pixel value of the first pixel; and
increase a current applied to the light source unit to increase the output luminance of the light source unit.

3. The image display apparatus according to claim 2, wherein the display control unit is configured to:
reduce the first pixel value of the first pixel by a first ratio; and
increase the output luminance of the light source unit by a second ratio that is a reciprocal number of the first ratio.

4. The image display apparatus according to claim 1, wherein
a resolution of an image output by the sub-image projection unit is lower than a resolution of an image output by the main image projection unit.

5. The image display apparatus according to claim 1, wherein
a maximum luminance output by the sub-image projection unit is lower than a maximum luminance output by the main image projection unit.

6. The image display apparatus according to claim 1, wherein the display control unit is further configured to:
detect a second pixel of the plurality of pixels, wherein a first pixel value of the second pixel falls below a lower limit value; and
set the first pixel value of the second pixel to a second pixel value of the second pixel before the correction of the plurality of pixel values.

7. The image display apparatus according to claim 6, wherein
the display control unit is further configured to change the first pixel value of the second pixel to a third pixel value of the second pixel, and
the third pixel value of the second pixel is obtained by addition of the lower limit value and the second pixel value of the second pixel by a ratio corresponding to a difference between the lower limit value and the second pixel value of the second pixel.

8. The image display apparatus according to claim 1, wherein the display control unit is further configured to output the plurality of pixel values to the correction unit based on an increase of each pixel value of the plurality of pixel values by a specific value.

9. The image display apparatus according to claim 1, wherein
the display control unit is further configured to detect a second pixel of the plurality of pixels, wherein a pixel value of the second pixel falls below a lower limit value by the correction of the plurality of pixel values, and
the correction unit is further configured to:
adjust a correction intensity of the pixel value of the second pixel based on a difference between the lower limit value and the pixel value of the second pixel, wherein the pixel value of the second pixel is obtained before the correction of the plurality of pixel values; and
correct the pixel value of the second pixel based on the adjusted correction intensity.

10. An image display method, comprising:
in an image display apparatus comprising a light source unit and a plurality of image projection units, wherein the plurality of image projection units include a main image projection unit and a sub-image projection unit:
correcting each pixel value of a plurality of pixel values of a plurality of pixels included in image information, wherein each pixel value of the plurality of pixels is corrected for deterioration of an image;
detecting a pixel of the plurality of pixels, wherein a first pixel value of the pixel exceeds an upper limit value based on the correction of the plurality of pixel values;
determining a saturation amount of the pixel based on a difference between the first pixel value of the pixel and the upper limit value;
generating a second pixel value of the pixel based on the saturation amount of the pixel, wherein the second pixel value of the pixel is equal to or smaller than the upper limit value;
increasing output luminance of the light source unit to increase display luminance of the pixel having the generated second pixel value;
distributing the first pixel value of the pixel to a plurality of distribution pixel values;
outputting the upper limit value to the main image projection unit;
outputting the saturation amount of the pixel to the sub-image projection unit; and
controlling the plurality of image projection units to project a plurality of images based on the plurality of distribution pixel values, the output of the upper limit value, and the output of the saturation amount, wherein a plurality of projection positions of the plurality of images are identical.

11. An information processing apparatus, comprising:
a correction unit configured to correct deterioration of an image to be projected by an image display apparatus based on image information including a plurality of pixel values a plurality of pixels, wherein the deterioration is corrected by correction of each pixel value of the plurality of pixel values;
a display control unit configured to:
detect a pixel of the plurality of pixels, wherein a first pixel value of the pixel exceeds an upper limit value based on the correction of the plurality of pixel values;
determine a saturation amount of the pixel based on a difference between the first pixel value of the pixel and the upper limit value;
generate a second pixel value of the pixel based on the saturation amount of the pixel, wherein the second pixel value of the pixel is equal to or smaller than the upper limit value;
increase output luminance of a light source unit of the image display apparatus to increase display luminance of the pixel having the generated second pixel value;
distribute the first pixel value of the pixel to a plurality of distribution pixel values;
output the upper limit value to a main image projection unit of a plurality of image projection units of the image display apparatus;
output the saturation amount of the pixel to a sub-image projection unit of the plurality of image projection units; and
control the plurality of image projection units of the image display apparatus to project a plurality of images based on the plurality of distribution pixel values, the output of the upper limit value, and the output of the saturation amount, wherein a plurality of projection positions of the plurality of images are identical.

12. An information processing method, comprising:
in an information processing apparatus:
correcting deterioration of an image to be projected by an image display apparatus based on image information including a plurality of pixel values of a plurality of pixels, wherein the deterioration is corrected by correction of each pixel value of the plurality of pixel values;
detecting a pixel of the plurality of pixels, wherein a first pixel value of the pixel exceeds an upper limit value by the correction of the plurality of pixel values;
determining a saturation amount of the pixel based on a difference between the first pixel value of the pixel and the upper limit value;
generating a second pixel value of the pixel based on the saturation amount of the pixel, wherein the second pixel value of the pixel is equal to or smaller than the upper limit value;

increasing output luminance of a light source unit of the image display apparatus to increase display luminance of the pixel having the generated second pixel value;

distributing the first pixel value of the pixel to a plurality of distribution pixel values;

outputting the upper limit value to a main image projection unit of a plurality of image projection units of the image display apparatus;

outputting the saturation amount of the pixel to a sub-image projection unit of the plurality of image projection units; and controlling the plurality of image projection units of the image display apparatus to project a plurality of images based on the plurality of distribution pixel values, the output of the upper limit value, and the output of the saturation amount, wherein a plurality of projection positions of the plurality of images are identical.

13. A non-transitory computer-readable medium having stored thereon computer-executable instructions which, when executed by a computer, cause the computer to execute operations, the operations comprising:

correcting deterioration of an image to be projected by an image display apparatus based on image information including a plurality of pixel values of a plurality of pixels, wherein the deterioration is corrected by correction of each pixel value of the plurality of pixel values;

detecting a pixel of the plurality of pixels, wherein a first pixel value of the pixel exceeds an upper limit value based on the correction of the plurality of pixel values;

determining a saturation amount of the pixel based on a difference between the first pixel value of the pixel and the upper limit value;

generating a second pixel value of the pixel based on the saturation amount of the pixel, wherein the second pixel value of the pixel is equal to or smaller than the upper limit value;

increasing output luminance of a light source unit of the image display apparatus to increase display luminance of the pixel having the generated second pixel value;

distributing the first pixel value of the pixel to a plurality of distribution pixel values;

outputting the upper limit value to a main image projection unit of a plurality of image projection units of the image display apparatus;

outputting the saturation amount of the pixel to a sub-image projection unit of the plurality of image projection units; and controlling the plurality of image projection units of the image display apparatus to project a plurality of images based on the plurality of distribution pixel values, the output of the upper limit value, and the output of the saturation amount, wherein a plurality of projection positions of the plurality of images are identical.

14. An image display apparatus, comprising:

a light source unit;

a correction unit configured to correct deterioration of an image to be projected based on image information including a plurality of pixel values of a plurality of pixels, wherein the deterioration is corrected by correction of each pixel value of the plurality of pixel values; and a display control unit configured to:
    detect a first pixel of the plurality of pixels, wherein a first pixel value of the first pixel exceeds an upper limit value based on the correction of the plurality of pixel values;
    determine a saturation amount of the first pixel based on a difference between the first pixel value of the first pixel and the upper limit value;
    generate a second pixel value of the first pixel based on the saturation amount of the first pixel, wherein the second pixel value of the first pixel is equal to or smaller than the upper limit value;
    increase output luminance of the light source unit to increase display luminance of the first pixel having the generated second pixel value; and
    detect a second pixel of the plurality of pixels, wherein a pixel value of the second pixel falls below a lower limit value by the correction of the plurality of pixel values, wherein the correction unit is further configured to:
    adjust a correction intensity of the pixel value of the second pixel based on a difference between the lower limit value and the pixel value of the second pixel, wherein the pixel value of the second pixel is obtained before the correction of the plurality of pixel values; and
    correct, based on the adjusted correction intensity, the pixel value of the second pixel obtained before the correction of the plurality of pixel values.

* * * * *